(12) United States Patent
Krause

(10) Patent No.: US 10,995,839 B2
(45) Date of Patent: May 4, 2021

(54) TORQUE-TRANSMITTING DEVICE

(71) Applicant: Schaeffler Technologies AG & Co. KG, Herzogenaurach (DE)

(72) Inventor: Thorsten Krause, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 22 days.

(21) Appl. No.: 16/477,831

(22) PCT Filed: Dec. 13, 2017

(86) PCT No.: PCT/DE2017/101071
§ 371 (c)(1),
(2) Date: Jul. 12, 2019

(87) PCT Pub. No.: WO2018/130239
PCT Pub. Date: Jul. 19, 2018

(65) Prior Publication Data
US 2019/0368591 A1 Dec. 5, 2019

(30) Foreign Application Priority Data
Jan. 16, 2017 (DE) .......................... 102017100665.6

(51) Int. Cl.
*F16H 45/02* (2006.01)
*F16H 57/00* (2012.01)
*F16F 15/20* (2006.01)

(52) U.S. Cl.
CPC .......... *F16H 45/02* (2013.01); *F16H 57/0006* (2013.01); *F16F 15/20* (2013.01); *F16H 2045/0268* (2013.01)

(58) Field of Classification Search
CPC ................. F16H 45/02; F16H 57/0006; F16H 2045/0268; F16H 2045/0205; F16H 2045/0221; F16H 2045/007; F16F 15/20
See application file for complete search history.

(56) References Cited

U.S. PATENT DOCUMENTS

| | | | | |
|---|---|---|---|---|
| 3,024,668 A | * | 3/1962 | Kronogard | F16H 47/085 475/35 |
| 3,772,939 A | * | 11/1973 | Hause | F16H 47/085 475/46 |
| 4,289,044 A | * | 9/1981 | Dorpmund | F16H 47/085 475/50 |
| 4,924,978 A | * | 5/1990 | Ohkubo | F16H 45/02 192/106 F |
| 5,857,934 A | * | 1/1999 | Ohkubo | F16H 47/085 475/36 |

(Continued)

FOREIGN PATENT DOCUMENTS

| DE | 19729617 A1 | 2/1998 |
|---|---|---|
| DE | 102011007117 A1 | 10/2012 |

(Continued)

*Primary Examiner* — Mark A Manley
(74) *Attorney, Agent, or Firm* — LeKeisha M. Suggs

(57) ABSTRACT

A torque-transmitting device comprises a torque converter arranged at least partially within a housing of the torque-transmitting device. The torque converter has a pump impeller, a turbine wheel, and a guide wheel. The guide wheel is connected to a stator shaft. An actuator is coupled to the stator shaft and is configured to exert a torque on the guide wheel via the stator shaft.

8 Claims, 1 Drawing Sheet

(56) References Cited

U.S. PATENT DOCUMENTS

| | | | |
|---|---|---|---|
| 6,159,123 | A | 12/2000 | Gumpoltsberger |
| 6,685,593 | B1 * | 2/2004 | Meier-Burkamp ..... F16H 3/663 475/35 |
| 8,608,604 | B1 | 12/2013 | Jawalkar Nagaraj et al. |
| 8,939,860 | B2 | 1/2015 | Dogel et al. |
| 9,500,259 | B1 | 11/2016 | Bai |
| 2013/0020166 | A1 | 1/2013 | Robinette et al. |
| 2014/0047949 | A1 | 2/2014 | Lorenz et al. |
| 2015/0065294 | A1 | 3/2015 | Borntrager et al. |
| 2015/0072822 | A1 | 3/2015 | Swank et al. |
| 2016/0258519 | A1 | 9/2016 | Horita et al. |
| 2017/0159784 | A1 | 6/2017 | Basin et al. |

FOREIGN PATENT DOCUMENTS

| | | |
|---|---|---|
| DE | 102013220483 A1 | 6/2014 |
| WO | 2008046381 A1 | 4/2008 |

* cited by examiner

TORQUE-TRANSMITTING DEVICE

CROSS-REFERENCE TO RELATED APPLICATIONS

This application is the U.S. National Phase of PCT Appln. No. PCT/DE2017/101071 filed Dec. 13, 2017, which claims priority to DE 102017100665.6 filed Jan. 16, 2017, the entire disclosures of which are incorporated by reference herein.

TECHNICAL FIELD

The present disclosure relates to a torque-transmitting device comprising a torque converter, which is arranged at least partially within a housing of the torque-transmitting device and has a pump impeller, a turbine wheel and a guide wheel.

BACKGROUND

By means of a torque-transmitting device of this kind, which is sufficiently well known in the prior art, hydrodynamic power transmission is possible, with a fluid, in particular an oil, being accelerated toward the turbine wheel by the blades of the pump impeller. In this case, the pump impeller is driven by means of an input shaft, which is connected to a driving device. Here, the pump impeller and the turbine wheel have corresponding blades, at which the oil is accelerated or deflected. In the prior art, the guide wheel is usually connected in a fixed manner to the housing, and therefore relative motion between the two components is not possible. In this case, the working fluid can be supported on the blades of the guide wheel and thereby cause backpressure, giving rise to an increase in the torque at the blades of the turbine wheel. Thus, the torque at the turbine wheel is higher than the torque originally introduced by the driving device.

The prior art furthermore includes torque-transmitting devices in which a torsional damper is used in combination with power splitting, for example. U.S. Pat. No. 8,939,860 B2, for example, discloses a torque-transmitting device which has such a combination of a torsional damper and power splitting. Here, a vibration damping device is arranged within the housing of the torque converter, wherein power input via the lockup clutch, for example, is split by means of a planetary transmission. Owing to the arrangement of the vibration damping device within the torque converter or the housing of the torque converter, the vibration damping device is subject to the boundary conditions present within the housing of the torque converter. The vibration damping device is therefore subject to an absolute rotational speed and to the effects of centrifugal force. The vibration damping device is furthermore operated within the same medium which is present within the housing of the torque converter.

SUMMARY

It is therefore the underlying object of the present disclosure to specify an improved torque-transmitting device.

To achieve this object, provision is made, in a torque-transmitting device of the type stated at the outset, for the guide wheel to be connected to a stator shaft, which can be rotated relative to the housing of the torque converter, wherein an actuator is coupled to the stator shaft and is provided in order to exert a torque on the guide wheel via the stator shaft.

Accordingly, the present disclosure is based on the realization that, in contrast to the prior art, the guide wheel does not necessarily have to be connected in a fixed manner to the housing of the torque converter. Instead, the guide wheel can be arranged in such a way as to be rotatable relative to the housing of the torque converter, thus allowing a relative motion between the guide wheel and the housing. Of course, it is possible here for coupling to be provided between the guide wheel and the housing of the torque converter in certain operating states.

According to the present disclosure, the guide wheel is connected to a stator shaft, which is coupled to an actuator. The actuator is provided for the purpose of exerting a torque on the stator shaft, which is transferred to the guide wheel through the coupling of the stator shaft to the guide wheel. It is thus evidently possible to input torques into the system via the stator shaft and thus via the guide wheel by means of the actuator. It is thereby possible, through appropriate control of the actuator, to absorb or reduce vibrations which have been introduced via the driving device into the torque converter and thus into the torque-transmitting device. In particular, it is not necessary here for the stator shaft to rotate at a speed, in particular the absolute speed of the torque converter, e.g. of the pump impeller. On the contrary, it is envisaged that it should receive from the actuator a vibration power intended to neutralize vibrations present in the system. In particular, two power branches can be created by means of a power splitting device, with the result that the vibration power induced in one branch by means of the actuator allows almost complete absorption of the introduced vibrations by way of the anti-resonance—known from the prior art—with the undamped branch.

In embodiments, provision is made in the torque-transmitting device according to the present disclosure for a vibration damping device, which is arranged on the transmission side outside the housing of the torque-transmitting device, wherein the power splitting device is arranged within the housing of the torque-transmitting device, between the torque converter and a transmission input shaft. Accordingly, it is envisaged that the vibration damping device is not arranged within the housing of the torque converter, as is customary in the prior art. Thus, the vibration damping device does not undergo an absolute speed and, as a result, the negative effects, e.g. friction hysteresis, effects on durability and characteristic curve configuration, do not have to be taken into account in the design of the vibration damping device. In contrast, the embodiment described proposes that the vibration damping device is arranged outside the housing of the torque-transmitting device or torque converter. This makes it possible to operate the vibration damping device, which is designed as a torsional damper for example, independently of the boundary conditions of the rest of the torque-transmitting device or torque converter. In particular, the vibration damping device is arranged on the transmission side in relation to the torque-transmitting device or torque converter.

In embodiments, it is possible here to operate the vibration damping device selectively, e.g. in an encapsulated manner, with a different lubricant than the fluid within the torque converter. The vibration damping device is preferably arranged in this way and not, as is customary in the prior art, in the housing of the torque converter. Through arrangement on the transmission side, it is possible to support the vibration damping device independently of the housing of the torque converter or torque-transmitting device, enabling it to be operated free from the boundary conditions described.

In embodiments, provision is made here for the vibration damping device to be supported on a transmission housing directly or by means of the actuator or of a further actuator. According to the present disclosure, the vibration damping device is supported relative to the transmission housing, with the result that the vibration damping device does not rotate with the torque converter but that one side of the vibration damping device ultimately remains stationary together with the transmission housing. Furthermore, provision can be made here, as an alternative to direct support of the vibration damping device on the transmission housing, for "active" support of the vibration damping device on the transmission housing to be formed. For this purpose, use can preferably be made of an actuator, thus enabling the vibration damping device to be supported indirectly on the transmission housing and to be influenced by means of the actuator or of a further actuator.

According to an embodiment of the torque-transmitting device according to the present disclosure, provision can be made to enable a spring rate or a characteristic of the vibration damping device to be changed by means of the actuator or of a further actuator. According to this, the actuator can be controlled selectively in such a way or the vibration damping device can be switched in such a way by means of the actuator or of a further actuator that the spring rate or the characteristic of the vibration damping device can be changed. The spring rate or the characteristic of the vibration damping device can thus be set in accordance with the current operating point of the torque-transmitting device. It is thereby advantageously possible to change the vibration damping device in such a way in each operating state of the torque-transmitting device that as efficient as possible damping of occurring vibrations can be accomplished.

The above-described embodiment of the torque-transmitting device according to the present disclosure can furthermore make provision to enable the spring rate or the characteristic of the vibration damping device to be set by means of the actuator or of a further actuator in such a way that vibrations of one power branch of the power splitting device interfere destructively with vibrations of the other power branch.

Here, the power splitting device splits an input power or an input torque between two power branches, wherein one of the two power branches is damped by means of the vibration damping device. The vibrations split between the two power branches are then superimposed at the point at which the power branches are combined again. Depending on the operating state, it is possible, as described above, to change the characteristic or the spring rate of the vibration damping device by means of the actuator or of a further actuator, thus ensuring that the vibrations of the damped power branch can interfere destructively with the vibrations in the undamped power branch. The anti-resonance thereby created brings about particularly effective damping or absorption of the occurring vibrations, thus ensuring that as little as possible of the originally occurring vibrations is introduced into the transmission input shaft.

The torque-transmitting device according to the present disclosure can furthermore be developed to the effect that the power splitting device is designed as a planetary transmission or has such a transmission. Accordingly, it is possible to pass one power branch of the power splitting device through an annulus of the planetary transmission and to pass the other power branch through a sun wheel of the planetary transmission, thus enabling them to be combined again by means of the planetary transmission, in particular by the two inputs to the planets. As described above, one of the two power branches is coupled to the vibration damping device, thus enabling one power branch to be damped and the other power branch to be undamped.

According to an embodiment of the torque-transmitting device according to the present disclosure, provision can furthermore be made for a guide wheel connection piece of the torque converter to be connected to a sun wheel of the planetary transmission or for the guide wheel connection piece of the torque converter to be connected to the sun wheel of the planetary transmission and of the vibration damping device. Here, one of the two power branches passes through the guide wheel into the sun wheel, and the other power branch passes through the turbine wheel and/or the lockup clutch, via the annulus, into the planetary transmission. The force supported on the guide wheel or the torque introduced into said guide wheel is thus transferred to the sun wheel and introduced into the planetary transmission. According to embodiments, provision is made here for the sun wheel of the planetary transmission, which is connected to the guide wheel connection piece, simultaneously to be connected to the vibration damping device, with the result that the power branch passed via the guide wheel is the damped power branch. Vibrations introduced into the guide wheel can thus be transferred to the vibration damping device and damped by the latter.

For this purpose, the sun wheel and the guide wheel connection piece or guide wheel are arranged on a common stator shaft. According to this embodiment of the present disclosure, the guide wheel is not connected in a fixed manner to the housing of the torque converter but is rotatable relative thereto. As a result, a relative motion between the guide wheel and the housing of the torque converter is possible, and therefore vibrations in the torque-transmitting device which are transmitted to the guide wheel can be passed via the common stator shaft and damped by means of the vibration damping device. During this process, the stator shaft does not rotate absolutely at the speed of the torque converter but is merely subject to a "vibration power", which it transfers to the vibration damping device or, with damping by the latter, to the sun wheel.

In embodiments, provision can be made here for the sun wheel and/or the vibration damping device to be connected directly to the guide wheel connection piece or to a guide wheel freewheel inner ring. In this case, the guide wheel has a freewheel inner ring, by means of which free rotatability is ensured if the lockup clutch is closed. That is to say, above a certain speed, as soon as the lockup clutch is closed, it is ensured that the guide wheel can rotate freely with the turbine wheel.

The torque-transmitting device according to the present disclosure can furthermore be developed to the effect that the transmission input shaft is connected to a planet carrier of the planetary transmission. The two power branches, which, as described above, are introduced into the sun wheel via the guide wheel connection piece, on the one hand, and into the annulus via the turbine wheel, on the other hand, are combined by the planetary transmission, with the result that the two superimposed torques of the two power branches are transferred by the planet carrier to the transmission input shaft. As likewise already described, superimposition of the vibrations of the power branches occurs during this process, and therefore, in the particularly preferred case of anti-resonance, there is destructive interference between the vibrations of the two power branches and thus virtually complete extinction of the vibrations can be brought about. This ensures that the vibrations transmitted into the transmission input shaft via the planet carrier can be almost completely eliminated.

In the torque-transmitting device according to the present disclosure, provision can furthermore be made for the annulus of the planetary transmission to be connected to an output of a lockup clutch and to the turbine wheel, wherein the input of the lockup clutch is connected to the drive. Thus, in accordance with the opening or closing state of the lockup clutch, the power is split by means of the lockup clutch into the annulus or into the annulus via the turbine wheel, while the second power branch is passed into the sun wheel via the guide wheel or guide wheel connection piece, as described above.

BRIEF DESCRIPTION OF THE DRAWINGS

The present disclosure is explained below by means of illustrative embodiments with reference to the drawings. The drawings are schematic illustrations, wherein.

DETAILED DESCRIPTION

Figure 1:
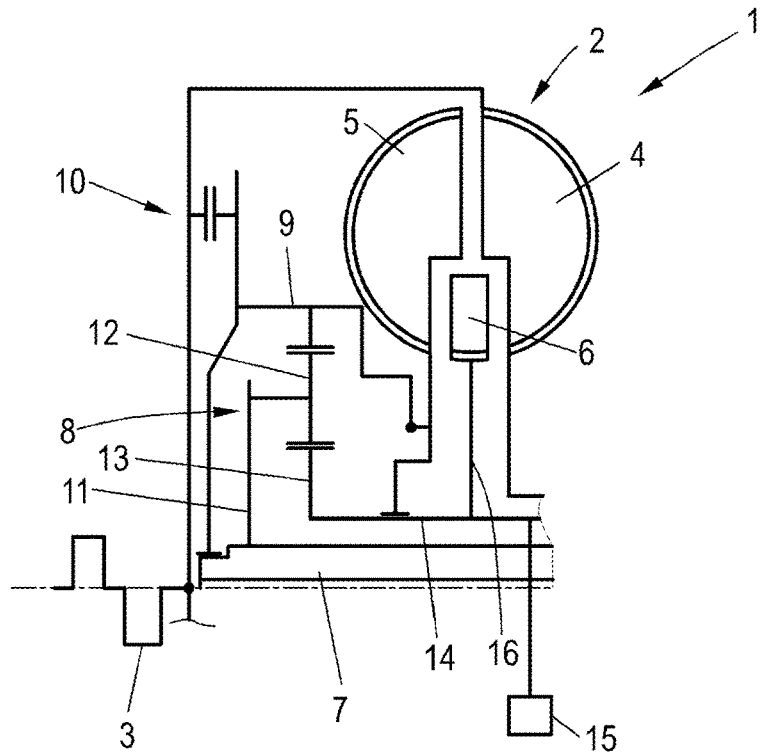
FIG. 1 shows a torque-transmitting device according to the present disclosure in accordance with a first illustrative embodiment.

FIG. 1 shows a torque-transmitting device 1 comprising a torque converter 2, which is coupled to a drive 3, e.g. an input shaft. The torque-transmitting device 1 furthermore has a pump impeller 4, a turbine wheel 5 and a guide wheel 6. The torque-transmitting device 1 is furthermore assigned a transmission input shaft 7 and a power splitting device 8.

The power splitting device 8 comprises an annulus 9, which is coupled or connected to a lockup clutch 10 and to the turbine wheel 5. The power splitting device 8 furthermore has a plurality of planets 12, which are supported by a planet carrier 11 and which mesh with the annulus 9, on the one hand, and with a sun wheel 13, on the other hand. The planet carrier 11 is connected to the transmission input shaft 7. The sun wheel 13 is arranged at one end of a stator shaft 14, wherein the stator shaft 14 is coupled to an actuator 15. The actuator 15 is intended to transmit a torque to the stator shaft 14. Since the stator shaft 14 is coupled to the guide wheel 6, it is possible to transfer a torque to the torque converter 2, in particular to the guide wheel 6, by means of the actuator 15. It is thus possible to input a vibration power into the system of the torque-transmitting device 1.

A torque introduced into the torque-transmitting device 1 via the drive 3 is thus transferred to the turbine wheel 5 via the pump impeller 4. By means of the power splitting, the torque in the first power branch is transferred to the annulus 9 via the turbine wheel 5 coupled to the annulus 9 and, in the other power branch, the torque is transferred to the stator shaft 14 via the guide wheel 6, via a guide wheel connection piece 16. The two power branches are thus combined in the power splitting device 8, which, as can be seen, is designed as a planetary transmission, since the planets 12 mesh both with the annulus 9 and with the sun wheel 13. If the lockup clutch 10 is closed, the torque induced by the drive 3 is introduced into the annulus 9 via the lockup clutch 10.

Accordingly, two power branches are obtained, wherein one power branch, which leads via the guide wheel 6 or guide wheel connection piece 20, can be damped by means of the actuator 15. In particular, it is possible to transfer a corresponding torque or corresponding vibrations to the stator shaft 14 and thus to the guide wheel 6 by selective control of the actuator 15. In the power splitting device 8, the two power branches are combined, with the result that the vibrations which occur in the individual power branches are superimposed. Through appropriate control of the actuator 15, it is thus possible, in particular, to ensure that the vibrations which occur in one power branch can be superimposed destructively with the vibrations occurring in the other power branch. Accordingly, it is possible to adjust the vibrations which occur in the damped power branch so that they are anti-resonant with respect to the vibrations of the undamped power branch and thus to achieve destructive superimposition. It is thereby possible for the vibrations ultimately introduced into the transmission input shaft 7 to be compensated almost completely on the basis of the anti-resonance.

Figure 2:
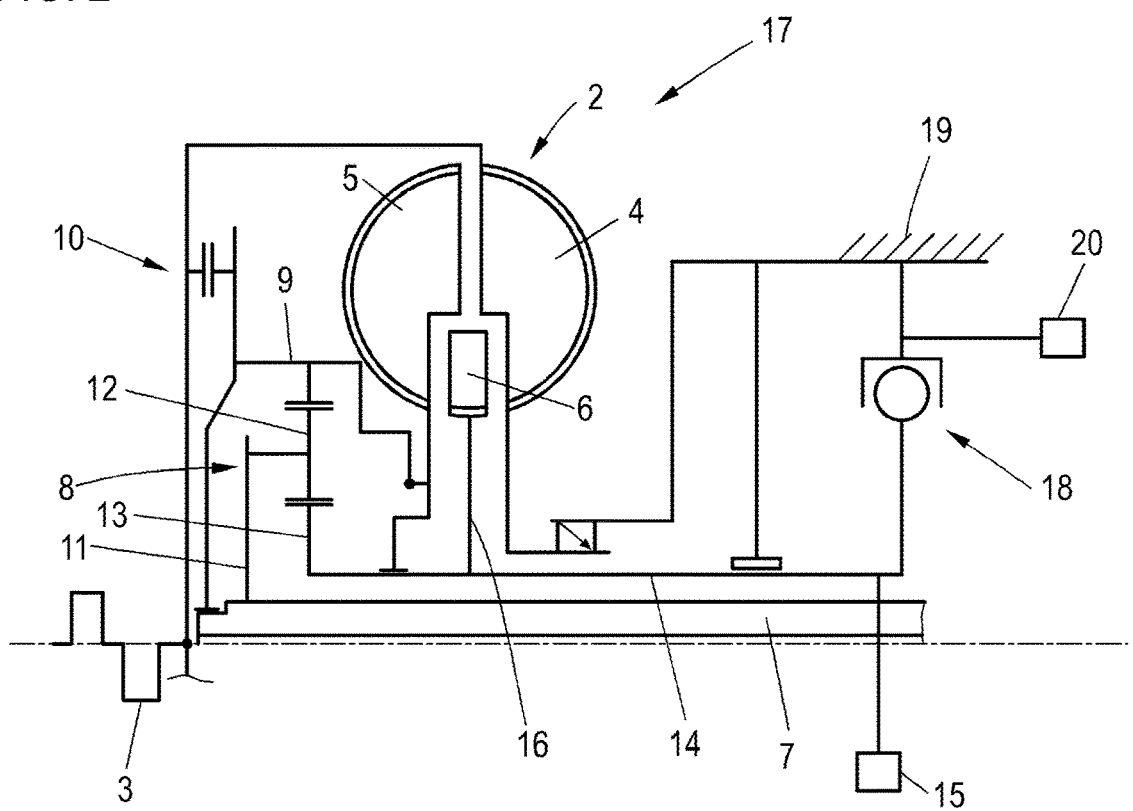
FIG. 2 shows a torque-transmitting device according to the present disclosure in accordance with a second illustrative embodiment.

FIG. 2 shows a torque-transmitting device 17 in accordance with a second illustrative embodiment. The torque-transmitting device 17 is similar in terms of fundamental construction to the torque-transmitting device 1 in FIG. 1, and therefore the same reference signs are used for the same components. In particular, the torque-transmitting device 1 likewise has a torque converter 2, a drive 3, a pump impeller 4, a turbine wheel 5 and a guide wheel 6. A power splitting device 8 is furthermore provided between the torque converter 2 and the transmission input shaft 7, said device comprising an annulus 9, a planet carrier 11, a plurality of planets 12 and a sun wheel 13. The sun wheel 13 is arranged on a stator shaft 14 on the drive side.

As in torque-transmitting device 1, the stator shaft 14 is coupled to an actuator 15, which is provided for the purpose of introducing torques into the stator shaft 14. In contrast to torque-transmitting device 1 in FIG. 1, torque-transmitting device 17 has a vibration damping device 18, which is arranged at the opposite end of the stator shaft 14 from the power splitting device 8. The vibration damping device 18 is designed as a torsional damper, for example, and, on the side opposite the stator shaft 14, is connected to a transmission housing 19 or supported on the transmission housing 19.

The torque-transmitting device 17 furthermore has a further actuator 20, or the actuator 20 is associated therewith, the actuator being provided for the purpose of varying the vibration damping device 18. Through appropriate control of the actuator 20, the spring rate or the characteristic of the vibration damping device 18 can be adjusted in such a way that the vibrations which occur in the damped power branch vibrate in anti-resonance with respect to the vibrations of the undamped power branch and can therefore be superimposed destructively on said vibrations. It is thereby possible for the vibrations ultimately introduced into the transmission input shaft 7 to be almost compensated on the basis of the anti-resonance. Through combination with the vibrations or vibration powers introduced into the stator shaft 14 by means of the actuator 15, it is thereby possible, in particular, to achieve introduction in real time, thus making it possible to perform optimum extinction of the vibrations introduced into the torque-transmitting device 17.

LIST OF REFERENCE SIGNS 1 torque-transmitting device
2 torque converter
3 drive
4 pump impeller 5 turbine wheel
6 guide wheel
7 transmission input shaft
8 power splitting device
9 annulus
10 lockup clutch
11 planet carrier
12 planet
13 sun wheel
14 stator shaft
15 actuator
16 guide wheel connection piece
17 torque-transmitting device
18 vibration damping device
19 transmission housing
20 actuator

The invention claimed is:

1. A torque-transmitting device comprising:
 a housing;
 a torque converter arranged at least partially within the housing and including:
  a pump impeller;
  a turbine wheel; and
  a guide wheel arranged for connecting to a stator shaft;
 an actuator coupled to the stator shaft and configured to exert a torque on the guide wheel via the stator shaft; and
 a power splitting device arranged within the housing between the torque converter and a transmission input shaft, wherein an annulus of the power splitting device is directly connected to an output of a lockup clutch and to the turbine wheel, the input of the lockup clutch being connected to a drive.

2. The torque-transmitting device as claimed claim 1, further comprising a vibration damping device arranged on the stator shaft.

3. The torque-transmitting device as claimed in claim 2, wherein the actuator is configured to change a spring rate or a characteristic of the vibration damping device.

4. The torque-transmitting device as claimed in claim 3, wherein the spring rate or the characteristic of the vibration damping device can be set by the actuator in such a way that vibrations of one power branch of the power splitting device interfere destructively with vibrations of the other power branch.

5. The torque-transmitting device as claimed in claim 2, wherein the power splitting device is a planetary transmission.

6. The torque-transmitting device as claimed in claim 5, wherein a guide wheel connection piece of the torque converter is connected to a sun wheel of the planetary transmission and the vibration damping device, and wherein the sun wheel is arranged on a first end of the stator shaft, the vibration damping device is arranged on a second, opposite end of the stator shaft, and the guide wheel connection piece is arranged between the sun wheel and the vibration damping device.

7. The torque-transmitting device as claimed in claim 6, wherein the sun wheel and the vibration damping device are connected directly to the guide wheel connection piece.

8. The torque-transmitting device as claimed in claim 5, wherein the transmission input shaft is connected to a planet carrier of the planetary transmission.

* * * * *